Patented June 1, 1937

2,082,518

UNITED STATES PATENT OFFICE 2,082,518

CATALYTIC POLYMERIZATION AND POLYMERIZATION CATALYSTS

Robert F. Ruthruff, Hammond, Ind., assignor Standard Oil Company, Chicago, Ill., a corporation of Indiana No Drawing. Application August 10, 1934,
Serial No. 739,281

17 Claims. (Cl. 196—10)

This invention relates to catalysts for the polymerization of unsaturated compounds and particularly for the polymerization of olefinic hydrocarbons having a molecular weight higher than that of ethylene. It also relates to polymerization processes utilizing these catalysts.

It is known that metallic halides such as aluminum chloride act as catalysts for the polymerization of gaseous olefins. These catalysts, although very active at first, lose their activity as a rule within a few minutes and are therefore not satisfactory. It has been proposed to use double salts formed from aluminum chloride and other metallic halides. The accepted theory has been that the second metallic halide used must necessarily be one having a highly polar nature. I have found that, contrary to expectations, highly superior results can be obtained in some cases by using double salts formed from aluminum chloride or other similar metallic halides and metallic halides having a relatively non-polar nature.

Polarity is determined by the magnitude of the intermolecular forces on the one hand and by the unsymmetrical nature of the molecule as measured by the distance between the center of intermolecular force and the center of mass of the molecule on the other hand. Since in the case of the metallic halides with which we are dealing, the molecule is in all cases unsymmetrical, the degree of polarity depends largely on the magnitude of the intermolecular forces. The magnitude of the intermolecular forces is again a rough measure of the internal pressure as shown by the fact that internal pressure may be defined as the pressure that would be necessary to compress one gram molecular weight of a substance in the vapor state to the volume occupied by one gram molecular weight of that substance in the liquid state were there no intermolecular forces. From this it follows that the intermolecular forces and therefore the polarity in the case of a metallic halide having a high internal pressure are, in general, large and that the intermolecular forces and therefore the polarity in the case of a metallic halide having a low internal pressure are, in general, small. It thus appears that the polarity or non-polarity of the various metallic halides is roughly proportional to their internal pressures.

Internal pressure can be calculated in various ways with results only roughly consistent with each other. I prefer to calculate internal pressure in terms of the Hildebrand equation (Journal of the American Chemical Society, vol. 41, 1919, page 1069);

$$\pi = 20.65\,(5200+30 t_b)/V_{20}$$

in which $\pi$ is the internal pressure in atmospheres, $t_b$ is the boiling point in degrees centigrade and $V_{20}$ is the gram molecular volume of the liquid at 20° C. in cubic centimeters. Obviously this equation applies only to liquids but since the molecular volume of a liquid is almost identical with that of the same substance in the solid state it is evident that the application of this equation to solids results in only negligible errors.

Double salts of the following metallic chlorides with aluminum chloride have been proposed as polymerization catalysts. Their internal pressures are shown in the following table:

| Salt | $\pi$ |
|------|-------|
| NaCl | 37,100 |
| CuCl | 27,100 |
| AgCl | 26,200 |
| CaCl$_2$ | 21,400 |
| BaCl$_2$ | >19,900 |

It will be seen that each of these salts has a very high internal pressure as compared with that of AlCl$_3$ (4,120) or AlBr$_3$ (3,050). In fact, it has been the theory in the past that the substance used along with the aluminum chloride should be one of high polarity, or, in other words, of high internal pressure.

As previously pointed out, I have found that double salts formed from two metallic halides each of which has a low internal pressure, are excellent polymerization catalysts in contravention of the previously accepted theory.

It is to be understood that my polymerization catalysts are true complex compounds and are not mere solutions of two metallic halides. Such solutions are not satisfactory catalysts, usually exhibiting a rapid decline in activity with use. Furthermore, a great many pairs of metallic halides of low internal pressure do not form complex double salts. Whether or not such a compound will exist can be predicted to some extent by means of the criteria given by Kendall, Crittenden and Miller (Journal of the American Chemical Society, vol. 45, 1923, page 963). In the last analysis, however, whether such compound exists in any case under the conditions of the polymerization reaction must be determined by routine experiment, as will be readily understood by those skilled in the art. I have prepared three such compounds, namely, $HgAl_2Br_8$ _____ mercuric bromo aluminate
$SbAlBr_6$ _____ antimony bromo aluminate
$BiAlBr_6$ _____ bismuth bromo aluminate The corresponding iodides can also be used but the chlorides and fluorides of low internal pressure do not, in general, form double salts, although double salts of this type between the chloride of one metal and the bromide or iodide of the other may exist in some cases.

In the instance where stable compounds exist these double salts can be prepared by melting the two halides together in the indicated stoichiometrical proportion.

The internal pressures of the metal halides used in preparing the above indicated double salts are as follows:

| Salt | $\pi$ |
|---|---|
| $AlBr_3$ | 3,050 |
| $HgBr_2$ | 4,400 |
| $SbBr_3$ | 3,250 |
| $BiBr_3$ | 4,900 |

These values are given in the Journal of American Chemical Society, vol. 45, 1923, page 988.

I prefer, in general, to use double salts of two metallic halides, each of which has an internal pressure of below about 10,000 atmospheres and preferably below about 5,000 atmospheres. Aluminum halides, and particularly aluminum bromide, are preferred as one constituent.

My new catalysts have, in general, very low vapor pressures at the desired polymerization temperature and are therefore highly satisfactory since they do not volatilize out of the reaction vessel. Thus, for instance, at the boiling point of aluminum chloride under atmospheric pressure $SbAlBr_6$ has a vapor pressure of about 165 mm. and $HgAl_2Br_8$ has a vapor pressure of about 128 mm. Similarly, at the normal boiling point of $AlBr_3$, $SbAlBr_6$ has a vapor pressure of about 513 mm. and $HgAl_2Br_8$ has one of about 384 mm.

My polymerization catalysts are, in general, not satisfactory for the polymerization of ethylene and are highly satisfactory for the polymerization of propylene, butylene and higher olefinic hydrocarbons and other unsaturated compounds. They will operate either as solids or as liquids and the material undergoing polymerization may be in either the vapor or the liquid state or partly in each. I also find that these catalysts can be used to sweeten gasoline and other light oils and to remove sulfur compounds from hydrocarbon gases and liquids in general.

Perhaps the most important use of these polymerization catalysts is the polymerization of normally gaseous olefins heavier than ethylene to form liquid polymerization products including under suitable conditions considerable gasoline. The catalysts can be used in any convenient type of chamber. As previously indicated, they can be used either below or above the melting point. I prefer to use my catalyst in solid form supported on some suitable support such as pumice. A supported catalyst can be readily prepared by spraying the molten material on the pumice either in the reaction vessel or otherwise. The operating conditions, including pressure, temperature and the time of contact, can be varied within wide limits. Thus, temperatures as low as 90° F. in some cases and temperatures as high as 500° F. in other cases can suitably be used. In typical cases the reaction temperature will vary from about 150° F. to about 400° F. The pressure may be at least as low as 200 pounds per square inch and may be as high as 3000 pounds per square inch or even higher. A suitable typical pressure is 750 pounds per square inch. Reaction times may be in some cases as low as one or two seconds and in other cases as high as 10 or 15 minutes. Typical times of contact will range from 30 seconds to 5 minutes. It should be understood that the reaction temperature to be used in any particular case will depend on the particular catalyst used, the particular stock to be treated, the results desired, etc. Furthermore, a change in the one variable will effect a change in other variables, thus for instance, at high temperatures very low times of contact can be used, whereas at low temperatures much longer contact times may be necessary.

As specific examples of the use of my catalysts, I will tabulate below the results of certain experiments in which a mixture of 31% propylene and 69% propane was passed into a reaction vessel consisting of a three foot length of ⅜ inch alloy steel tubing containing my catalysts supported on pumice. The pressure used was 750 pounds per square inch and the temperature was controlled by a jacket around the reaction vessel. The feed material was passed in continuously and the products were withdrawn continuously and condensed. The table below indicates the catalyst used, the average temperature of the jacket surrounding the reaction vessel, the average time in seconds that any given proportion of the charge was in contact with the catalyst, the rate of feed in grams per hour, the amount of liquid produced directly and the additional amount recovered in the condenser, both expressed in grams per hour, the percentage conversion to liquid materials based on the weight of inlet olefins and the weight percent olefins consumed as determined from olefine analyses of the inlet and exit gases.

| Temp. °F. | Time sec. | Feed gm./hr. | Liquid gm./hr. | Cond. gm./hr. | Wt. % olefins converted | Wt. % olefins consumed | Catalyst |
|---|---|---|---|---|---|---|---|
| 111 | 298 | 267.0 | 82.5 | 1.0 | 105.0 | 98.8 | $SbAlBr_6$ |
| 167 | 254 | 276.7 | 78.7 | 3.2 | 98.4 | 95.8 | $HgAl_2Br_8$ |
| 198 | 234 | 281.6 | 80.7 | 1.7 | 98.4 | 96.8 | $HgAl_2Br_8$ |
| 103 | 364 | 208.6 | 20.2 | 0.9 | 34.1 | 49.4 | $BiAlBr_6$ |
| 370 | 31 | 429.0 | 36.0 | 1.0 | 29.1 | 42.5 | $BiAlBr_6$ |

It will be noted that the percent converted was greater than the percent consumed in the case of the runs using $SbAlBr_6$ and $HgAl_2Br_3$. This is necessarily due to the conversion of some of the propane into liquid materials, which is probably in turn due to the fact that the polymerizing molecules form clusters about a catalytic nucleus and then combine to form a polymer giving off excess energy due to their activation and to the exothermic nature of the polymerization reaction with the result that this energy is to some extent picked up by propane molecules causing them to crack and polymerize.

In the experiments outlined above the gasoline content of the conversion products was low but much higher proportions of gasoline are obtained at higher temperatures with lower times of contact.

It will be noted from the above table that the antimony and mercury double salts were highly superior to the bismuth double salt, although the latter was decidedly effective. The results with antimony and mercury double salts are considerably better than any which have been obtained with sodium aluminum chloride, which is one of the most satisfactory of the catalysts composed of aluminum chloride or bromide in combination with a metallic halide of high polarity or high internal pressure. Thus, using the same stock, the same reaction vessel and the same pressure with sodium aluminum chloride at a temperature of 250° F. and a contact time of 58 seconds, the proportion of olefins converted was only 49.5% by weight as compared with 98 to 105% with two of my catalysts at temperatures very much lower and with contact times only slightly higher.

As compared with non-catalytic polymerization, the results are, of course, even more striking, as illustrated by the following table:

*Comparison of catalytic and non-catalytic polymerization*

| Catalyst | None | SbAlBr$_4$ |
|---|---|---|
| Charge | 100% ethylene | 31% propylene 69% propane |
| Temperature, °F | 650 | 111 |
| Pressure, lbs. per sq. inch | 3,000 | 750 |
| Time, minutes | 60 | 5 |
| % Conversion | 30 | 105 |

It will be observed that in the above tabulation, all conditions favor the non-catalytic reaction. In the non-catalytic run the concentration of the charge is over threefold greater while the pressure is fourfold greater, so on this basis alone the non-catalytic run should proceed twelve times as fast as the catalytic. The temperature difference is 539° F. which should account for a reaction rate in the non-catalytic system greater than in the catalytic. On the basis of concentration of reactants and temperature alone the non-catalytic reaction should have a velocity many times as great as the catalytic, yet in the catalytic system three times as much conversion is obtained in one-twelfth the reaction time.

Since my new catalysts are not, in general, effective for the polymerization of ethylene, they can be used to effect separation between ethylene and higher olefins by polymerizing the latter and since paraffin hydrocarbons are affected only to a minor degree by my catalysts, they can also be removed from propylene and higher olefins by polymerizing the latter.

At somewhat higher temperatures and lower pressures than those indicated above my catalysts can be used for the cracking of hydrocarbons and particularly normally gaseous hydrocarbons.

While I have described my invention in connection with certain specific embodiments thereof and in connection with certain theories of operation, these embodiments and theories are by way of illustration rather than by way of limitation and I do not mean to be bound thereby except to the limitations of the appended claims.

I claim:

1. A catalyst for the conversion of normally gaseous hydrocarbons containing olefins having a molecular weight greater than that of ethylene comprising a double salt of an aluminum halide and a metallic halide selected from the group consisting of metallic bromides and metallic iodides, said metallic halide having an internal pressure of not more than about 10,000 atmospheres, said double salt being substantially stable during the conversion of hydrocarbons.

2. A polymerization catalyst comprising a double salt of aluminum bromide and a metallic halide selected from the group consisting of the metallic bromides and metallic iodides having internal pressures of not more than about 10,000 atmospheres, said double salt being substantially stable during the polymerization of hydrocarbons.

3. A catalyst for the polymerization of normally gaseous olefins comprising a double salt selected from the group consisting of mercuric bromo aluminate, antimony bromo aluminate and bismuth bromo aluminate, said double salt being substantially stable during the polymerization of normally gaseous olefins.

4. A process for polymerizing a normally gaseous olefinic hydrocarbon having a molecular weight higher than that of ethylene comprising contacting said hydrocarbon with a double salt selected from the group consisting of mercuric bromo aluminate, antimony bromo aluminate and bismuth bromo aluminate at a temperature of at least 90° F. and at a pressure of at least 200 pounds per square inch for a sufficient period of time to accomplish the desired reaction.

5. A process for polymerizing a normally gaseous olefinic hydrocarbon having a molecular weight higher than that of ethylene comprising contacting said hydrocarbon with a double salt selected from the group consisting of mercuric bromo aluminate, antimony bromo aluminate and bismuth bromo aluminate at a temperature within the approximate range 90° F. to 500° F. and at a pressure within the approximate range 200 pounds per square inch to 3000 pounds per square inch for from about one second to about 15 minutes.

6. A process for polymerizing a normally gaseous olefinic hydrocarbon having a molecular weight higher than that of ethylene comprising contacting said hydrocarbon with a double salt selected from the group consisting of mercuric bromo aluminate, antimony bromo aluminate and bismuth bromo aluminate at a temperature within the approximate range 150° F. to 400° F. and at a pressure within the approximate range 200 pounds per square inch to 3000 pounds per square inch for from about 30 seconds to about five minutes.

7. A process for the polymerization of normally gaseous unsaturated hydrocarbons having a molecular weight greater than that of ethylene, comprising contacting said hydrocarbons with a double salt of aluminum bromide and a metallic halide selected from the group consisting of those metallic bromides and metallic iodides having internal pressures of not more than 10,000 atmospheres, said double salts being substantially stable during the polymerization of said hydrocarbons.

8. A process for polymerizing normally gaseous olefinic hydrocarbons having a molecular weight greater than that of ethylene, comprising contacting said hydrocarbons at polymerizing temperature with a double salt selected from the group consisting of mercuric bromo aluminate, antimony bromo aluminate and bismuth bromo aluminate.

9. A process for the treatment of normally gaseous olefinic hydrocarbons having a molecular weight greater than that of ethylene to convert the same into liquid hydrocarbons suitable for motor fuel, which comprises subjecting said gaseous olefinic hydrocarbons at polymerizing temperature to the action of a double salt selected from the group consisting of mercuric bromo aluminate, antimony bromo aluminate and bismuth bromo aluminate.

10. A process for the conversion of normally gaseous hydrocarbons containing unsaturated hydrocarbons having a molecular weight greater than that of ethylene into hydrocarbons of higher molecular weight, which comprises contacting said hydrocarbons with a stable double salt of an aluminum halide and a metallic halide selected from the group consisting of those metallic bromides and metallic iodides having internal pressures of not more than 10,000 atmospheres.

11. A process for the conversion of normally gaseous hydrocarbons containing olefinic hydrocarbons having a molecular weight greater than that of ethylene into hydrocarbons of a higher molecular weight, which comprises contacting said normally gaseous hydrocarbons at elevated temperatures and pressures with a stable double salt of aluminum bromide and a metallic halide selected from the group consisting of those metallic bromides and metallic iodides having internal pressures of not more than 10,000 atmospheres.

12. A catalyst for the conversion of hydrocarbons containing normally gaseous olefins having a molecular weight greater than that of ethylene into higher molecular weight hydrocarbons, comprising a double salt of aluminum bromide and a metallic halide selected from the group consisting of those metallic bromides and metallic iodides having internal pressures of not more than about 5,000 atmospheres, and said double salt being substantially stable during the conversion of the hydrocarbons.

13. A process for converting normally gaseous unsaturated hydrocarbons having a molecular weight greater than that of ethylene into hydrocarbons of higher molecular weight, which comprises contacting said hydrocarbons at elevated temperatures and pressures with a stable double salt of aluminum bromide and a metallic halide selected from the group consisting of those metallic bromides and metallic iodides having internal pressures of not more than 10,000 atmospheres.

14. A process for polymerizing normally gaseous hydrocarbons containing olefinic hydrocarbons having a molecular weight greater than that of ethylene, comprising contacting said hydrocarbons with a stable double salt selected from the group consisting of mercuric bromo aluminate, antimony bromo aluminate and bismuth bromo aluminate at a temperature within the approximate range of 150° F. to about 500° F. and at a pressure within the approximate range of 200–3000 pounds per square inch for about 1 second to 15 minutes.

15. A process for the conversion of an admixture of normally gaseous hydrocarbons containing propane and olefins having a molecular weight greater than that of ethylene into higher molecular weight hydrocarbons, which comprises contacting said hydrocarbons at elevated temperature and pressure with a stable double salt selected from the group consisting of mercuric bromo aluminate, antimony bromo aluminate and bismuth bromo aluminate.

16. A process for the conversion of normally gaseous hydrocarbons containing propane and propylene into hydrocarbons of higher molecular weight, which comprises contacting said hydrocarbons at elevated temperatures and pressures with a stable double salt selected from the group consisting of mercuric bromo aluminate, antimony bromo aluminate and bismuth bromo aluminate.

17. In a process for the conversion of an admixture of normally gaseous hydrocarbons comprising paraffinic and olefinic hydrocarbons having a molecular weight greater than that of ethylene into normally liquid hydrocarbons boiling within the gasoline range, the steps comprising contacting the admixture of normally gaseous hydrocarbons at elevated temperature and pressures with a stable double salt of an aluminum halide and a metallic halide selected from the group consisting of those metallic bromides and metallic iodides having internal pressures of not more than 10,000 atmospheres.

ROBERT F. RUTHRUFF.

Certificate of Correction

Patent No. 2,082,518.

June 1, 1937.

ROBERT F. RUTHRUFF

It is hereby certified that error appears in the printed specification of the above numbered patent requiring correction as follows: Page 2, second column, line 58, for the last portion of the second formula "Br$_3$" read $Br_8$; and that the said Letters Patent should be read with this correction therein that the same may conform to the record of the case in the Patent Office.

Signed and sealed this 3rd day of August, A. D. 1937.

[SEAL]

HENRY VAN ARSDALE,
*Acting Commissioner of Patents.* perature to the action of a double salt selected from the group consisting of mercuric bromo aluminate, antimony bromo aluminate and bismuth bromo aluminate.

10. A process for the conversion of normally gaseous hydrocarbons containing unsaturated hydrocarbons having a molecular weight greater than that of ethylene into hydrocarbons of higher molecular weight, which comprises contacting said hydrocarbons with a stable double salt of an aluminum halide and a metallic halide selected from the group consisting of those metallic bromides and metallic iodides having internal pressures of not more than 10,000 atmospheres.

11. A process for the conversion of normally gaseous hydrocarbons containing olefinic hydrocarbons having a molecular weight greater than that of ethylene into hydrocarbons of a higher molecular weight, which comprises contacting said normally gaseous hydrocarbons at elevated temperatures and pressures with a stable double salt of aluminum bromide and a metallic halide selected from the group consisting of those metallic bromides and metallic iodides having internal pressures of not more than 10,000 atmospheres.

12. A catalyst for the conversion of hydrocarbons containing normally gaseous olefins having a molecular weight greater than that of ethylene into higher molecular weight hydrocarbons, comprising a double salt of aluminum bromide and a metallic halide selected from the group consisting of those metallic bromides and metallic iodides having internal pressures of not more than about 5,000 atmospheres, and said double salt being substantially stable during the conversion of the hydrocarbons.

13. A process for converting normally gaseous unsaturated hydrocarbons having a molecular weight greater than that of ethylene into hydrocarbons of higher molecular we'ght, which comprises contacting said hydrocarbons at elevated temperatures and pressures with a stable double salt of aluminum bromide and a metallic halide selected from the group consisting of those metallic bromides and metallic iodides having internal pressures of not more than 10,000 atmospheres.

14. A process for polymerizing normally gaseous hydrocarbons containing olefinic hydrocarbons having a molecular weight greater than that of ethylene, comprising contacting said hydrocarbons with a stable double salt selected from the group consisting of mercuric bromo aluminate, antimony bromo aluminate and bismuth bromo aluminate at a temperature within the approximate range of 150° F. to about 500° F. and at a pressure within the approximate range of 200–3000 pounds per square inch for about 1 second to 15 minutes.

15. A process for the conversion of an admixture of normally gaseous hydrocarbons containing propane and olefins having a molecular weight greater than that of ethylene into higher molecular weight hydrocarbons, which comprises contacting said hydrocarbons at elevated temperature and pressure with a stable double salt selected from the group consisting of mercuric bromo aluminate, antimony bromo aluminate and bismuth bromo aluminate.

16. A process for the conversion of normally gaseous hydrocarbons containing propane and propylene into hydrocarbons of higher molecular weight, which comprises contacting said hydrocarbons at elevated temperatures and pressures with a stable double salt selected from the group consisting of mercuric bromo aluminate, antimony bromo aluminate and bismuth bromo aluminate.

17. In a process for the conversion of an admixture of normally gaseous hydrocarbons comprising paraffinic and olefinic hydrocarbons having a molecular weight greater than that of ethylene into normally liquid hydrocarbons boiling within the gasoline range, the steps comprising contacting the admixture of normally gaseous hydrocarbons at elevated temperature and pressures with a stable double salt of an aluminum halide and a metallic halide selected from the group consisting of those metallic bromides and metallic iodides having internal pressures of not more than 10,000 atmospheres.

ROBERT F. RUTHRUFF.

Certificate of Correction

Patent No. 2,082,518.

June 1, 1937.

ROBERT F. RUTHRUFF

It is hereby certified that error appears in the printed specification of the above numbered patent requiring correction as follows: Page 2, second column, line 58, for the last portion of the second formula "Br$_3$" read $Br_8$; and that the said Letters Patent should be read with this correction therein that the same may conform to the record of the case in the Patent Office.

Signed and sealed this 3rd day of August, A. D. 1937.

[SEAL]

HENRY VAN ARSDALE,
*Acting Commissioner of Patents.*

Certificate of Correction

Patent No. 2,082,518. June 1, 1937.

ROBERT F. RUTHRUFF

It is hereby certified that error appears in the printed specification of the above numbered patent requiring correction as follows: Page 2, second column, line 58, for the last portion of the second formula "$Br_3$" read $Br_8$; and that the said Letters Patent should be read with this correction therein that the same may conform to the record of the case in the Patent Office.

Signed and sealed this 3rd day of August, A. D. 1937.

[SEAL]

HENRY VAN ARSDALE,
*Acting Commissioner of Patents.*